(12) United States Patent
Barton (10) Patent No.: US 7,926,835 B2
(45) Date of Patent: Apr. 19, 2011

(54) WHEELED GOLF BAG ARRANGEMENT

(76) Inventor: Michael R. Barton, Waltham, MA (US)

(*) Notice: Subject to any disclaimer, the term of this patent is extended or adjusted under 35 U.S.C. 154(b) by 0 days.

(21) Appl. No.: 12/079,243

(22) Filed: Mar. 25, 2008

(65) Prior Publication Data
US 2008/0252044 A1    Oct. 16, 2008

Related U.S. Application Data

(62) Division of application No. 11/119,639, filed on May 2, 2005, now Pat. No. 7,347,443.

(51) Int. Cl.
*B62B 1/00* (2006.01)
(52) U.S. Cl. .............. 280/658; 280/651; 280/DIG. 6; 280/47.17
(58) Field of Classification Search .............. 280/42, 280/651, 652, DIG. 6, 646, 47.131, 47.17, 280/47.24, 47.26
See application file for complete search history.

(56) References Cited

U.S. PATENT DOCUMENTS

| | | | | |
|---|---|---|---|---|
| 4,685,561 A | * | 8/1987 | Reimers | 206/315.6 |
| 5,267,750 A | * | 12/1993 | Thompson | 280/646 |
| 5,351,983 A | * | 10/1994 | Descalo | 280/646 |
| 5,799,967 A | * | 9/1998 | Lin | 280/646 |
| 6,050,592 A | * | 4/2000 | Kim | 280/652 |

* cited by examiner

*Primary Examiner* — J. Allen Shriver, II
*Assistant Examiner* — Katy Meyer
(74) *Attorney, Agent, or Firm* — Don Halgren (57) ABSTRACT

A golf club bag assembly is shown for carrying a plurality of golf clubs therein. The bag assembly comprises an elongated spine having upper end and a lower end, an upper frame member attached to the upper end of the spine at a first acute angle with respect thereto, a lower frame member attached to the lower end of the spine at a second acute angle with respect thereto, a resilient enclosure attached to the spine and the upper and lower frame members, and wherein the first angle is equal to the second angle.

7 Claims, 7 Drawing Sheets

WHEELED GOLF BAG ARRANGEMENT

This is a divisional application of U.S. patent application Ser. No. 11/119,639, filed May. 2, 2005 now U.S. Pat. No. 7,347,443, which is incorporated herein by reference, in its entirety.

BACKGROUND OF THE INVENTION

1. Field of the Invention

The present invention relates to golf club bags and more particularly to wheeled golf club bags having stable storage capabilities.

2. Prior Art

Golfing is an old sport. It dates back hundreds of years. The equipment of this sport is constantly being improved to hopefully allow the players to improve their game. Clubs and balls are being changed to improve the accuracy of the hit and the distance that the ball travels. One area sorely in need of improvement is the bag in which the golf clubs are carried to make it easier to use by the golfer.

The popularity of this sport has drawn all sorts of people to play this game. The golf clubs themselves, as a collection, may be very heavy and cumbersome. The prior art has shown that the golf club bags may be attached to a separate cart with wheels thereon, for pulling over the golf course. Other prior art golf club bags have shown such bags with wheels there attached.

The prior art wheeled golf club bag arrangement have failed to introduce stable arrangements to properly provide for mobility as well as ease of storability.

It is an object of the present invention, to overcome the disadvantages of the prior art.

It is a further object of the present invention to provide a wheeled golf club bag which has the stability and mobility not found in the prior art.

It is still yet a further object of the present invention to provide a mobile golf club bag which is easy to use, has structural characteristics which facilitates the ease of its use in varying settings, and to permit its movement up and down stairs, and into and out of storage compartments such as may be found in automobiles or the like.

It is still yet a further object of the present invention, to provide a mobile golf club bag which is stable in its opened configuration as well as in its compact and folded down configuration, and may be easily removed from a trunk of an auto, or easily loaded into an airport baggage drop-off.

It is a further object of the present invention to provide a wheel assembly which has wheels which may be readily removed for ease of storage.

BRIEF SUMMARY OF THE INVENTION

The present invention comprises an elongated wheeled golf club bag assembly having an open upper end frame member and a closed lower end frame member. The opened upper end and the closed lower end have an elongated enclosure of resilient material arranged therearound, comprising a generally cylindrical shaped "housing", defining a longitudinal axis of the elongated golf club bag.

The closed lower end frame member of the golf club bag is disposed at an acute angle with respect to the longitudinal axis of the bag. The upper end frame member of the golf club bag comprises a molded frame which is parallel to the lower end of the golf club bag. The upper end is thus also arranged at an acute angle with respect to the longitudinal axis of the golf club bag. The longitudinal axis defines a center of gravity disposed generally at a mid-point of said longitudinal axis.

The golf club bag has a forward side and a rearward side. The forward side has an internal spine running longitudinally therealong. The spine is connected to the upper frame member of the golf club bag and to the lower frame member of the golf club bag.

An articulable wheel assembly is arranged on the forward side of the longitudinal spine on the forward side of the golf club bag.

The wheel assembly comprises a bracket arranged at a midpoint along the longitudinal spine of the golf club bag. The wheel of assembly also includes a pair of elongated multiple side arms each of which have an upper end which are pivotably secured to a support bracket arranged longitudinally adjacent the pivot bracket on the golf club bag, and a lower end which are each arranged to support a wheel. The support bracket is arranged so as to permit the outward pivoting of each pair of side arms from a first or innermost close-to-bag orientation, to an outermost position wherein those pairs of side arms are spread apart. Each pair of elongated side arms have a lower end which is attached to a wheel bracket. Each wheel bracket is attached to a hub which each thus supports its respective wheel thereon.

A pivotable handle is arranged at the bracket on the spine. A pull rod is arranged pivotably attached to a lower end of the pivotable handle and is connected to a lower portion of each side arm arrangement.

Pivotable motion of the pivotable handle from a downward configuration sweeping outwardly and upwardly to a locked fully and possibly telescopably extended (in one embodiment) position adjacent the upper end of the golf club bag, effects a pulling on the respective pull rods arranged on the lower end of the pivotable handle. Those respective pull rods are pivotably attached to the side arm, as aforementioned, to pull those side arms forwardly and outwardly to provide a "spreading apart" of the wheels and to provide a stable support for the golf club bag thereattached on a typical uneven golf course.

The upper frame member has a handle grasp or clip on its forward most edge. The grasp or clip is of generally U shape, and has a pair of cam fingers on the inner side faces of the clip. The cam fingers permit entry of the pivotable handle into the clip, and secures that handle thereagainst during use as it allows the golf club bag to be pulled along on a golf course. The clip, attached to the forward end of the upper frame member is resilient, so as to be spread apart to permit the pivotable handle to be pivoted downwardly when the golf club bag is to be put into storage.

The pivotable handle has an upper end which has a telescoping handle arranged therethrough. The telescoping handle is securably arranged, to permit longitudinal adjustability of the telescoping handle with respect to the pivotable handle.

The longitudinal portion of the second side of the elongated golf club bag has an upper or first handle and a separate, lower or second handle thereon. These upper and lower handles, are spaced apart and are adjacent their respective ends of the golf club bag. Such a double, spaced apart handle arrangement permits the ease of loading and unloading such an elongated bag into and out of a storage compartment as may be found in the trunk of a vehicle.

The closed configuration of the wheel assembly, when the pivotable handle is directed downwardly and parallel to the spine of the bag, permits the wheels to be closely held, adjacent the lower end of the bag. Each wheel has an axis supported by the hub at each end of the side arms at the wheel bracket. The axis of these wheels is arranged forward (to the left as shown in the drawings) of the center of gravity of the golf club bag assembly. The lowermost edge of each of these wheels, as viewed from the side, lies in a plane common to the lowest side of the lower frame member. The lower frame member is thus parallel with the ground surface and thus forms a stable base when the wheel assembly is collapsed against the golf club bag, so as to permit the golf club bag of the present invention to stand upright on a horizontal surface with great stability as well as providing the stability to that golf club bag when the wheels are spread apart and more forward, on an uneven surface as may be found on a typical golf course.

The wheels, in a further embodiment, may be "snap" removable from their axis adjacent the hub on the wheel bracket, to permit those larger wheels to be removed for ease of carrying should the need be desired. The elongated bag has its internal spine around which the resilient cover is built. The width and diameter of the wheels permit the golf club bag of the present invention to be easily pulled upstairs while the wheel assembly is in its "collapsed" configuration. A cover may be arranged over the elongated bag of the present invention with the cover having a forward clip which mates within the handle grasp at the upper end of the spine on the forward end of the upper frame member.

The invention thus comprises a golf club bag assembly for carrying a plurality of golf clubs therein. The bag assembly comprises an elongated spine having upper end and a lower end; an upper frame member attached to the upper end of the spine at a first acute angle with respect thereto; a lower frame member attached to the lower end of the spine at a second acute angle with respect thereto; a resilient enclosure attached to the spine and the upper and lower frame members; and wherein the first angle is equal to the second angle. The enclosure has a first side and a second side, the first side having an articulable wheel assembly thereon. An upper handle and a lower handle are arranged in a spaced apart location on the second side of the enclosure. The wheel assembly includes a pair of wheels which are movable from a closed position to a spaced apart position to define together with the lower frame member, a stable golf bag in both its closed position and its wheel spaced apart position. The lower frame member is parallel to a support surface when the wheel assembly is in its closed position. The wheels have a lower edge and the lower frame is aligned in a common plane when the wheel assembly is in its closed position. The wheels have a lower edge is askew from the plane defined by the lower frame when the wheel assembly is in its open position.

The invention also includes a golf club bag assembly for carrying a plurality of golf clubs therein, the bag assembly comprising: an-elongated spine having upper end and a lower end; an upper frame member attached to the upper end of the spine at a first acute angle with respect thereto; a lower frame member attached to the lower end of the spine at a second acute angle with respect thereto; a resilient enclosure attached to the spine and the upper and lower frame members; and wherein the enclosure has a first side and a second side, the first side having an articulable wheel assembly thereon with a pivotable elongated handle thereon, the upper frame member having a handle receiving clip thereto for securing the handle in an uprightmost orientation. The handle may be telescopable with respect to the wheel assembly. The wheel assembly has a pair of wheels removably supported in a wheel bracket. The golf bag enclosure defines a longitudinal axis of the assembly, the longitudinal axis having a mid point generally defining a center of gravity which center of gravity is vertically arranged between an axis of the wheels and a center of the lower frame member when the wheel assembly is in its closed position, to insure stability to the bag assembly of the bag assembly at rest and in a wheel closed position. The wheels are parallel to one another when the wheel assembly is in the "wheel closed" position and when the wheel assembly is in a "wheel open" or apart position. The wheels assembly is narrower than the enclosure when the wheel assembly is in its closed position. The wheels are preferably at least about ten to twelve inches in diameter. The bag assembly may include a padded cover to protect the bag contents during travel and storage.

BRIEF DESCRIPTION OF THE DRAWINGS

The objects and advantages of the present invention will become more apparent when viewed in conjunction with the following drawings, in which.

DETAILED DESCRIPTION OF THE PREFERRED EMBODIMENTS

Figure 1:
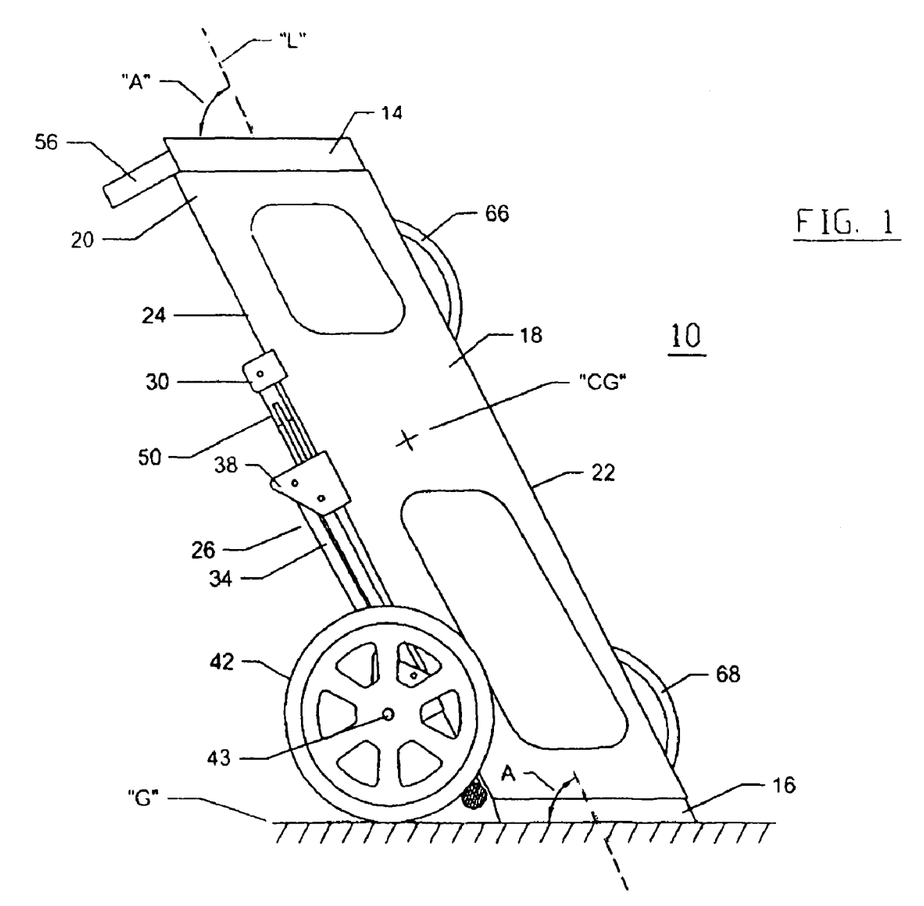
FIG. 1 is a side elevational view of the elongated golf club bag of the present invention, having a wheel assembly shown in its closed or "collapsed" configuration.

Referring now to the drawings in detail, and particularly to FIG. 1, there is shown the present invention which comprises an elongated wheeled golf club bag assembly 10 having an open upper end frame member 14 and a closed lower end frame member 16. The opened upper end frame member 14 and the closed lower end frame member 16 have an elongated enclosure 18 of resilient material arranged therearound, comprising a generally cylindrical shaped "housing", and also defining a longitudinal axis "L" of the elongated golf club bag assembly 10.

The closed lower end frame member 16 of the golf club bag assembly 10 is disposed at an acute angle "A" of about 20 to 40 degrees with respect to the longitudinal axis "L" of the bag assembly 10. The upper end frame member 14 of the golf club bag assembly 10 comprises a molded plastic frame which is parallel to the lower frame member 16 at the lower end of the golf club bag assembly 10, as may be seen in FIGS. 1-3. The upper end frame member 14 is thus also arranged at an acute angle "A" with respect to the longitudinal axis "L" of the golf club bag assembly 10, as may be seen in FIG. 1.

The golf club bag assembly 10 has a first side 20 and a second side 22. The first side 20 has an internal spine 24 running longitudinally therealong. The internal spine 24 is preferably connected to both the upper frame member 14 of the golf club bag assembly 10 and to the lower frame member 16 of the golf club bag assembly 10.

An articulable wheel assembly 26 is secured to the first side 20 of the longitudinal spine 24 on the forward side of the golf club bag assembly 10.

Figure 2:
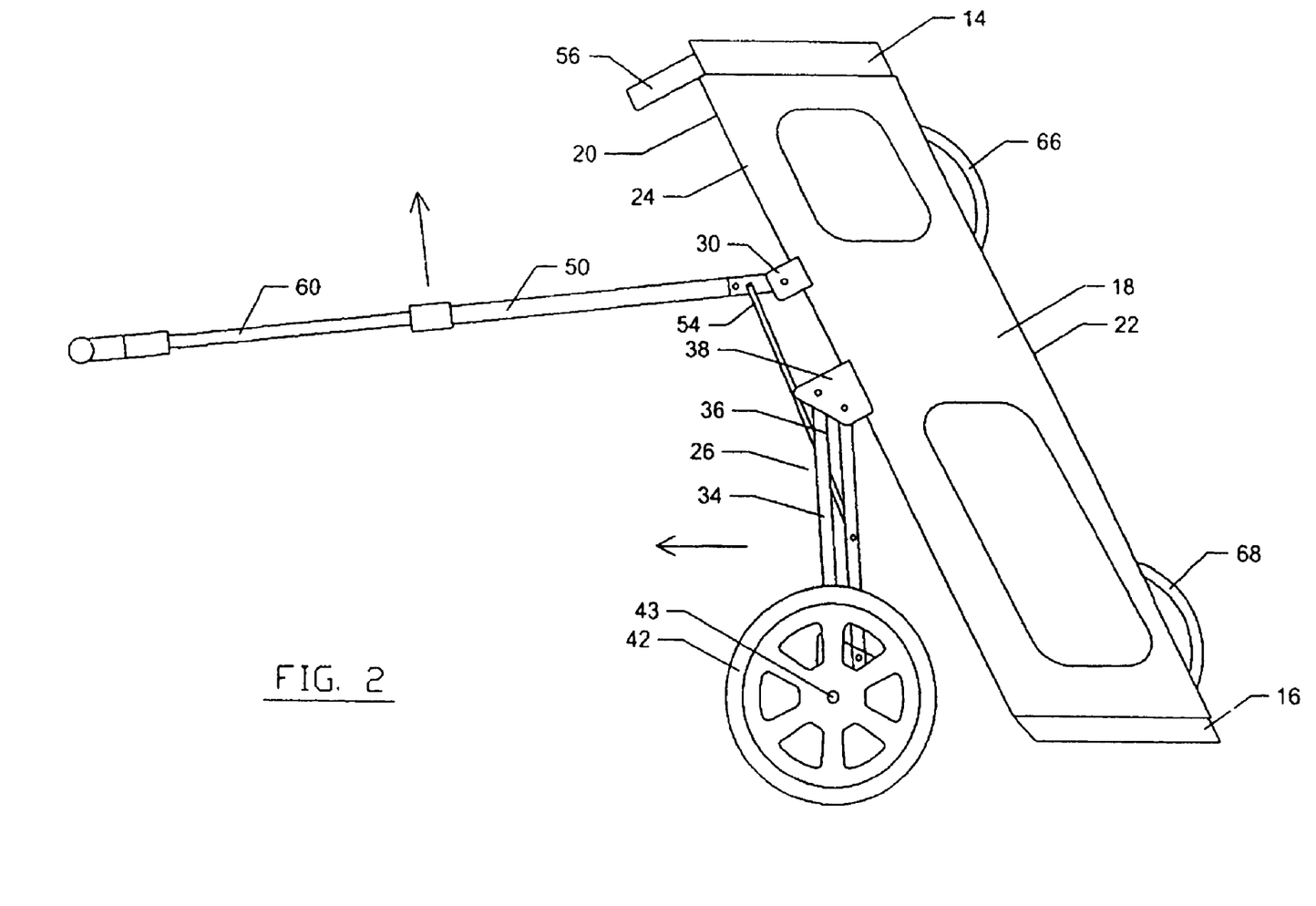
FIG. 2 is a side elevational view similar to FIG. 1 showing the wheel assembly being spread out, and a telescoping handle pivoted forwardly with respect to the golf club bag so as to effect the spreading out of those wheels.
Figure 3:
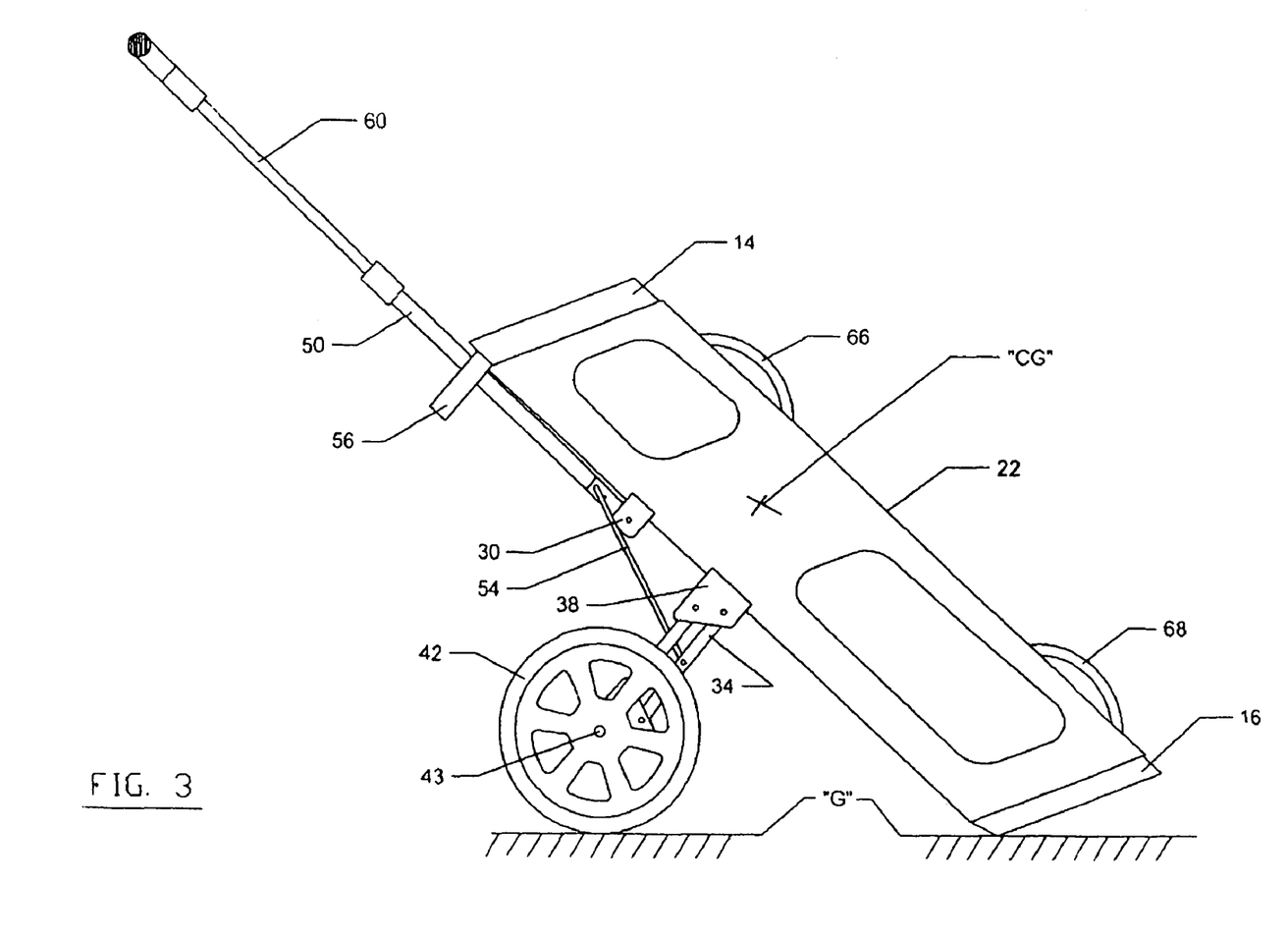
FIG. 3 is a side elevational view of a golf club bag of the present invention showing the wheels in their fully extended configuration and the pull handle thereon in its full parallel configuration with respect to the bag.
Figure 4:
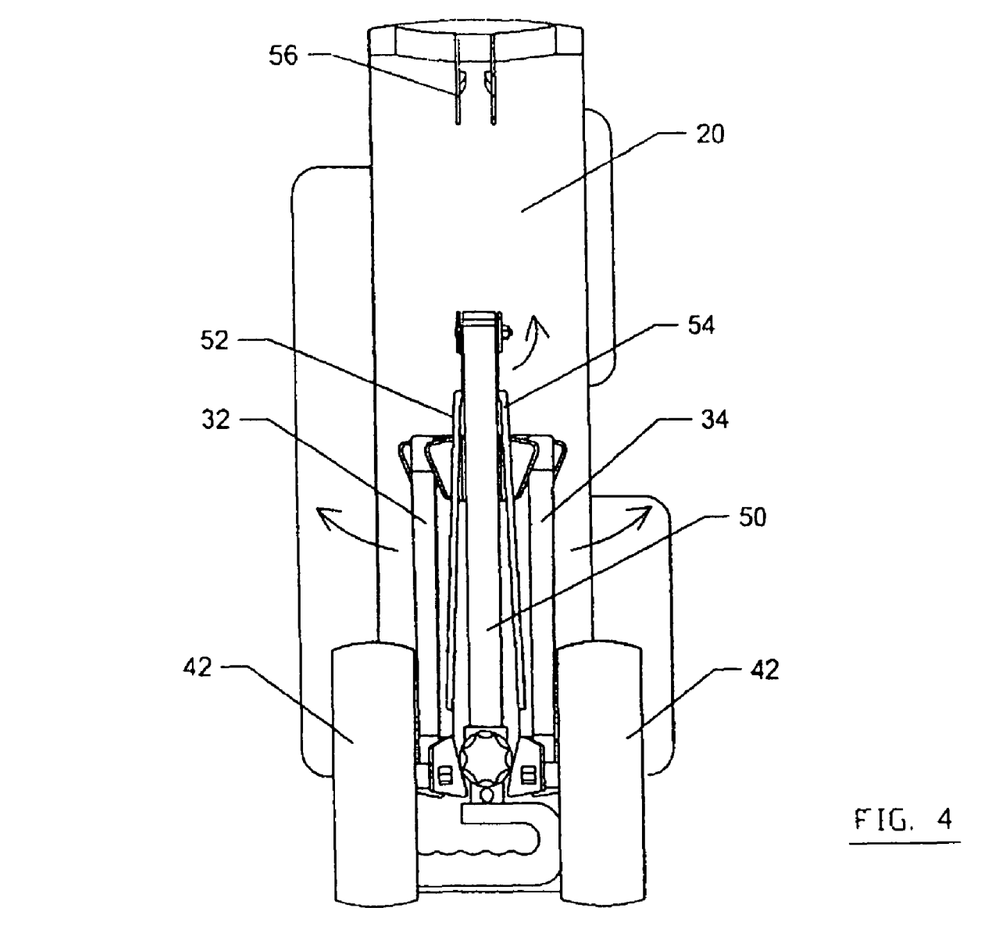
FIG. 4 is an elevational view of the elongated bag showing the wheel assembly in its collapsed configuration with the handle pivoted downwardly.
Figure 5:
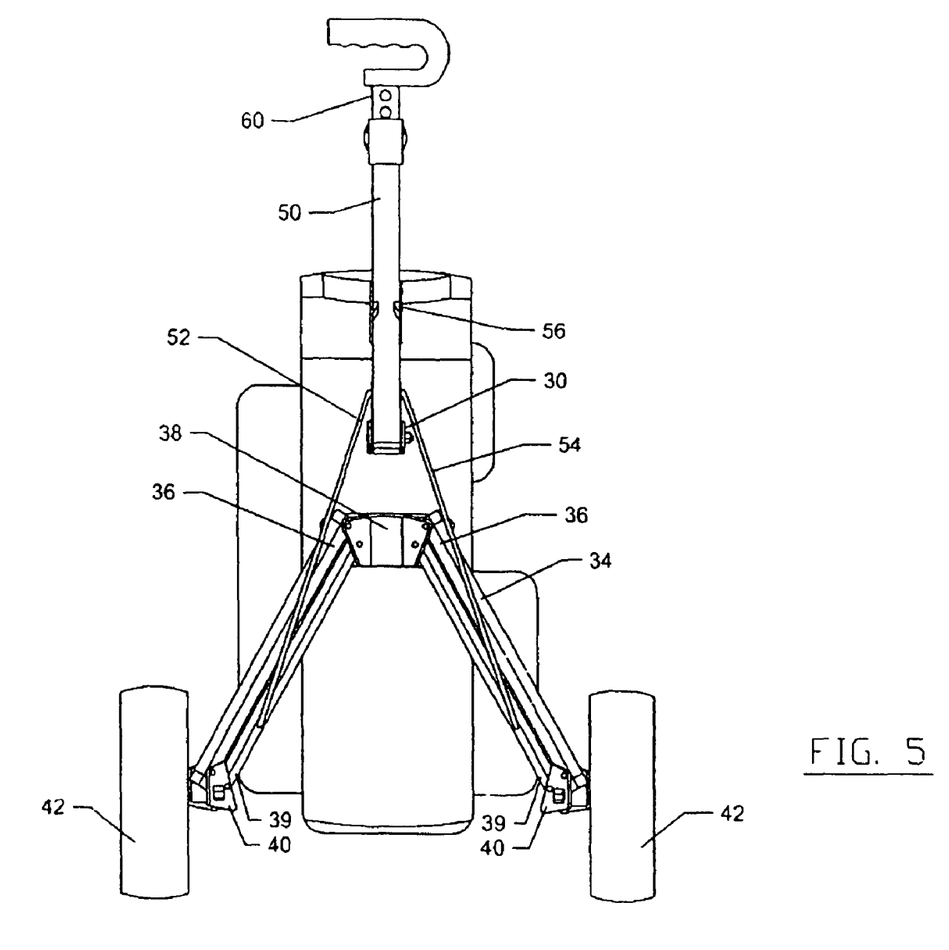
FIG. 5 is a view similar to FIG. 4 showing the wheel assembly fully extended and the pivotable handle in its full upright configuration, and engaged at the upper end of the golf club bag.
Figure 6:
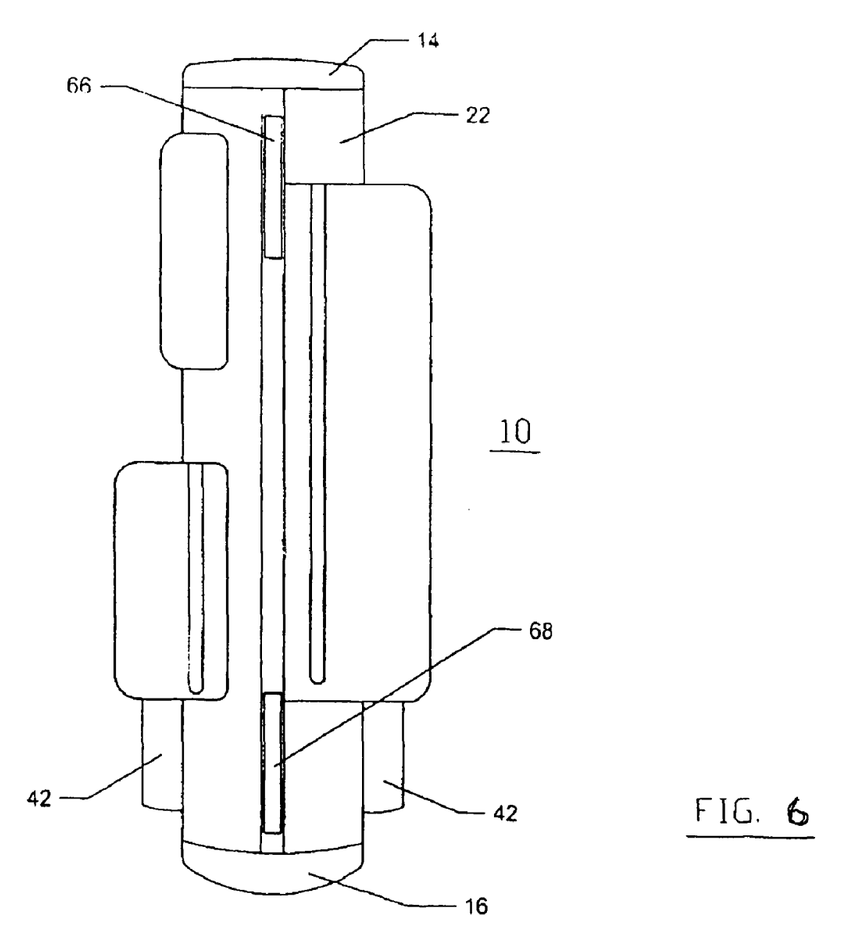
FIG. 6 is an elevational view looking at the rear side of the elongated golf club bag, showing the wheels and thus the wheel assembly in its closed configuration.

The wheel assembly 26 comprises a bracket 30 arranged at a midpoint along the longitudinal spine 24 of the golf club bag assembly 10. The wheel assembly 26 also includes a pair of elongated multiple side arms 32 and 34, each of which have an upper end 36 which are pivotably secured to a support bracket 38 arranged longitudinally adjacent the pivot bracket 30 on the golf club bag assembly 10, (as best seen in FIGS. 1 and 5) and a lower end 39 which are each pivotally secured to arranged to a wheel support bracket 40 which bracket 40 each releasably supports a wheel 42. Each wheel support bracket 40 is arranged so as to permit the outward pivoting of each pair of side arms 32 and 34 from a closed first or innermost "close-to-bag" orientation as shown in FIG. 4, to an outermost position wherein those pairs of side arms 32 and 34 are spread apart, as represented in FIG. 5. Each pair of elongated side arms 32 and 34 have their respective lower ends 39 pivotally attached to its wheel bracket 40. Each wheel bracket 40 is attached to a hub 44 which each thus releasably supports its respective wheel 42 thereon by a snap mating arrangement for any desired quick release preceding storage As shown in FIGS. 1, 2 and 3, a pivotable handle 50 is articulably arranged at the pivot bracket 30 on the spine 24. A pair of pull rods 52 and 54 are pivotably attached to a lower end of the pivotable handle 50 and is connected to a lower portion of each side arm arrangement 32 and 34, as best seen in FIG. 5.

Pivotable motion of the pivotable handle 50 from a downward configuration as represented in FIG. 1 sweeping outwardly and upwardly as represented in FIG. 2, to a locked fully and possibly telescopably extended (in one embodiment) position adjacent the upper end of the golf club bag assembly 10 as represented in FIG. 3, effects a pulling on the respective pull rods 52 and 54 arranged on the lower end of the pivotable handle 50. Those respective pull rods 52 and 54 are pivotably attached to the side arms 32 and 34, as aforementioned, to pull those side arms 32 and 34 forwardly and outwardly to provide a "spreading apart" of the wheels 42, as represented in FIG. 5 and to provide a stable support for the golf club bag assembly 10 thereattached on a typical uneven golf course "G". The pair of wheels 42 (each about 12" in diameter) and the lower frame member 16 thus present a stable three point base properly supporting a bag assembly 10 having a center of gravity 'CG" between the ground contact point of the wheels 42 and the ground contact points/plane of the lower frame member 16, thus being able to provide bag assembly 10 a 'stand alone" stowage capability even when the wheel assembly 26 is in its "closed" configuration, as represented in FIG. 1.

Figure 7:
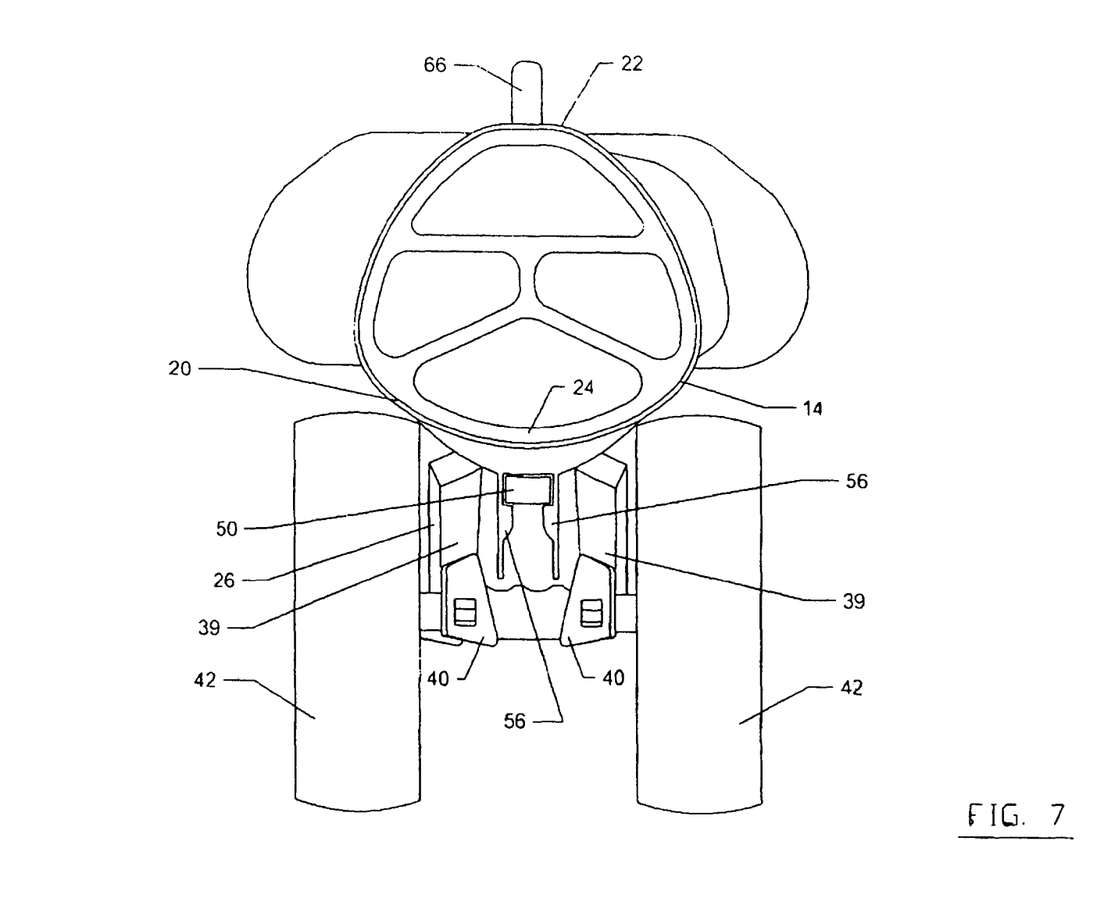
FIG. 7 is a planned view of the golf club bag and wheel assembly, with that wheel assembly in its closed configuration.

For lockingly receiving the handle 50, the upper frame member 14 has a handle grasp or clip 56 on its forward most edge, as shown in FIGS. 1-5 and 7. The grasp or clip 56 is of generally U shape as shown in FIG. 7, and has a pair of cam fingers 58 on the inner side faces of the clip 56. The cam fingers 58 permit slidable entry of the pivotable handle 58 into the clip 56, and secures that handle 56 thereagainst during use as it allows the golf club bag assembly 10 to be pulled along on a golf course. The clip 56, attached to the forward end of the upper frame member 14 is resilient, so as to be spread apart to permit the pivotable handle 50 to be pivoted downwardly when the golf club bag assembly 10 is to be put into storage.

The pivotable handle 50 has an upper end 60 which has a telescoping handle 60 arranged therethrough, as shown in FIGS. 2, 3 and 5. Depressable engaging buttons 62 may be arranged to contact a longitudinal series of detents 64 in the telescoping handle 60, as represented in FIG. 5, to permit longitudinal adjustability of the telescoping handle 60 with respect to the pivotable handle 50.

The rearside 22 longitudinal portion of the elongated golf club bag assembly 10 has an upper or first handle 66 and a separate, lower or second handle 68 thereon. These upper and lower handles, 66 and 68, are spaced apart and are adjacent their respective ends of the golf club bag assembly 10, as represented in FIGS. 1, 2, 3 and 6. Such a double, spaced apart handle arrangement permits the ease of loading and unloading such an elongated golf bag assembly 10 into and out of a storage compartment as may be found in the trunk of a vehicle.

The closed configuration of the wheel assembly 26, when the pivotable handle is directed downwardly and parallel to the spine 24 of the bag assembly 10, permits the wheels to be closely held, adjacent the lower end of the bag assembly 10. Each wheel 42 has an axis 43 supported by the hub wheel bracket 40 at each end of the side arms 32 and 34 at the wheel bracket 40. The axis 43 of these wheels 42 is arranged "forward" of the center of gravity CG of the golf club bag assembly 10. The lowermost edge of each of these wheels 42, as viewed from the side, lies in a in plane common to the lowest side of the lower frame member 16. The lower frame member 16 is thus parallel with the ground support surface 'G" as represented in FIG. 1, and thus forms a stable base when the wheel assembly 26 is collapsed against the golf club bag assembly 10, so as to permit the golf club bag assembly 10 of the present invention to stand upright on a horizontal surface with great stability as well as providing the stability to that golf club bag when the wheels are spread apart and more forward, on an uneven surface as may be found on a typical golf course.

The wheels 42, in a further embodiment, may be "snap" removable from their axis adjacent the hub bracket 42 on the wheel bracket, to permit those larger wheels 42 to be removed for ease of carrying should the need be desired. The elongated bag assembly 10 has its internal spine 24 around which the resilient cover 18 is built. The width and diameter of the wheels 42 permit the golf club bag assembly 10 of the present invention to be easily pulled upstairs while the wheel assembly 26 is in its "collapsed" configuration. A cover, not show for clarity, may be arranged over the elongated bag of the present invention with the cover having a forward clip which mates within the handle grasp at the upper end of the spine on the forward end of the upper frame member.

I claim:

1. An articulable, wheeled golf club bag assembly for carrying a plurality of golf clubs therein, said bag assembly comprising:

an elongated golf club bag enclosure having an open upper end and a closed lower end;

an elongated spine having an upper frame member attached to the upper end of the bag, arranged at a first acute angle with respect to a plane defining the open upper end of said upper frame member;

the elongated spine having a lower frame member attached to the lower end of said spine at an obtuse angle with respect to a plane defining the lower frame member, the plane defining the upper end of the golf club bag being parallel to the plane defining the lower end of the golf club bag, and a set of frame-supported wheels articulable with respect to the spine; and wherein the wheels are in "touching" alignment with both the ground and the lower end of the bag, when the frame supporting the wheels is in a "closed-in" orientation.

2. The golf bag assembly as recited in claim 1 wherein said enclosure has a first side and a second side, said first side has the articulable wheel assembly thereon.

3. The golf bag assembly as recited in claim 2, wherein an upper handle and a lower handle are arranged in a spaced apart location on said second side of said enclosure.

4. The golf bag assembly as recited in claim 2, wherein said wheel assembly includes a pair of wheels which are movable from a closed position to a spaced apart position to define together with said lower frame member, a stable golf bag in both its closed position and its wheel spaced position.

5. The golf bag assembly as recited in claim 4, wherein said lower frame member is parallel to a support surface when said wheel assembly is in its closed position.

6. The golf bag assembly as recited in claim 4, wherein said wheels have a lower edge and said lower frame aligned in a common plane when said wheel assembly is in its closed position.

7. The golf bag assembly as recited in claim 4, wherein said wheels have a lower edge is askew from the plane defined by said lower frame when said wheel assembly is in its open position.

* * * * *